A. BRIECHLE.
CALCULATING MACHINE.
APPLICATION FILED JULY 26, 1916.

1,260,632. Patented Mar. 26, 1918.
5 SHEETS—SHEET 2.

Fig. 2.

A. BRIECHLE.
CALCULATING MACHINE.
APPLICATION FILED JULY 26, 1916.

1,260,632.

Patented Mar. 26, 1918.
5 SHEETS—SHEET 3.

WITNESSES:

INVENTOR
Ambrosius Briechle
BY
ATTORNEYS

A. BRIECHLE.
CALCULATING MACHINE.
APPLICATION FILED JULY 26, 1916.

1,260,632.

Patented Mar. 26, 1918.
5 SHEETS—SHEET 5.

WITNESSES:
Jos. F. Collins
Ralph E. Warfield.

INVENTOR
Ambrose Briechle
BY
Sheffield Bolt
ATTORNEYS

UNITED STATES PATENT OFFICE.

AMBROSIUS BRIECHLE, OF BROOKLYN, NEW YORK, ASSIGNOR TO THE ADDER MACHINE COMPANY, OF WILKES-BARRE, PENNSYLVANIA, A CORPORATION OF PENNSYLVANIA.

CALCULATING-MACHINE.

1,260,632.  Specification of Letters Patent.  Patented Mar. 26, 1918.

Application filed July 26, 1916. Serial No. 111,354.

*To all whom it may concern:*

Be it known that I, AMBROSIUS BRIECHLE, a citizen of the United States, residing in the borough of Brooklyn, city and State of New York, have invented new and useful Improvements in Calculating-Machines, of which the following is a specification.

This invention relates more particularly to undisturbed total with split mechanisms for calculating machines.

Such machines of the well-known Wales type comprise a keyboard, an accumulating section including counters and counter-driving members, and a printer section, including type carriers in which the types are mounted.

Commonly, the means for driving the counters and the means for positioning the proper types at the printing line, have been undetachably connected for operation, so that the advance of the type-positioning means and the counter-driving means is perforce synchronous.

One of the objects of the present invention is to provide novel means for effecting a disconnection of the drive members and type-positioning bars, whereby the operator may actuate a manual device through a part of its stroke to effect a split in the printing section, in order to enable the registration and printing of separate columns of accumulating amounts, at one operation, and by a complete actuation of the manual device through its full stroke, may effect the split in the printing section and also disconnect that portion of the counter-driving means corresponding in denominations to the type carriers to the left of the split, from their respective type-positioning bars, to enable designating items to be printed to the left of the split without accumulating such items on the counters.

The carrying or transfer mechanism is not interrupted, however, so that under the latter adjustment, in case the total of amounts accumulating on the counters to the right of the split, exceeds the capacity of such counters, the total can be carried across the point of split onto the counters to the left thereof, whereon direct additions are prevented.

In order to print such excessive total, it is desirable that the disabled drive members normally adapted to coact with the counters to the left of the split, be again rendered effective to reverse the rotation of such counters in the usual manner of taking a total, to which end, I provide means to restore the connections between such counters and their corresponding positioning bars when the total key is operated, while the manual device which effects the disconnection of the drive members and their positioning bars, is still locked in its operated position.

In the first form illustrated, the total key does not eliminate the split in the printing section, but in the modification, such elimination is effected by the same operation of the total key which reëstablishes the connections between the drive members and their positioning bars.

Other objects and advantages will be set forth hereinafter and particularly pointed out in the claims.

In the accompanying drawings.

Reference is made to U. S. patents to Wales, #797,032, August 15, 1905; McFarland, #842,232, January 29, 1907; McFarland and Wales, #880,157, February 25, 1908; Wales, #940,758, November 23, 1909; and Wilgus, #1,133,596, March 30, 1915, for a more complete explanation of the customary devices in use in the Wales machine, and only such parts thereof will be referred to herein, as are correlated to the particular invention to be set forth.

A base 965 (Fig. 1) supports side frames 967 between which are mounted in train, from front to rear, the keyboard, the accumulating section, and the printer section.

The keys 117 of the keyboard are arranged in denominational rows, there preferably being a row of keys to correspond with each counter 490 of the accumulating mechanism, and each type carrier 514 of the printer section.

The keyboard and printer mechanisms are practically of the usual Wales type, the present invention relating particularly to the accumulator mechanism.

Thus, depression of any of the keys 117 in the banks, rocks levers 116 to project stops 115 into the paths of coacting positioning bars 310, which, in the present invention, take the place of the rack bars of former machines. Like such rack bars, these positioning bars are pivotally mounted at 350 and 350$^a$ to front and rear supporting arms 312 and 311 journaled, respectively, on the cross shaft 300 and cross rod 301 supported in the side frames 967. Links 515 connect rearward extensions 311$^a$ of each of the rear supporting arms 311 with the corresponding type bars or carriers 514, mounting the types 561.

The positioning bars are freed for action to position the types at the printing line, and retired to normal position to return the type bars through the usual restraining and restoring bar 205 and its connections to the main drive shaft 200 in a manner common to the Wales machine. The customary springs 383 connect the rear supporting arms 311 with the restraining and restoring bar 205.

The individual hammer pawls 518 normally lock the printing hammers 512 and are equipped with the usual cross over or transferring tails (not shown) to effect cipher printing to the right of any digit of a higher denomination, than units.

These tails are usually rigid with the pawls, but in the present instance, I have shown means to interrupt the imprint of ciphers to the right, by pivoting one of the tails 518$^a$ at 554, to its hammer pawl 518 and arranging a switch plate 515$^a$ (Figs. 1 to 4 and 6 to 8) slidably mounted in brackets 517 (Fig. 6) to control the position of the shiftable tail, which projects through a slot (Fig. 1) in the switch plate. The switch plate normally lies at one end of its stroke with the tail 518$^a$ under the adjacent hammer pawl 518 to the left. Depressing a key 417 pivoted at 450, to a split-controlling lever 421$^a$ journaled on the cross rod 404 supported in the side frames 967, rocks the lever downwardly against the tension of its restoring spring 481 (Fig. 6), and forces a switch or cam finger 517$^a$, pivoted to the lever at 537, through a guide slot 517$^b$ (Fig. 4) in the bracket 517. The switch or cam finger in its travel, wipes against a stud 254 (Fig. 6) on the switch plate 515$^a$ to shift the latter and displace the pivoted tail 518$^a$ from beneath the adjacent hammer pawl to the left, thus interrupting the continuance of cipher printing to the right, by forming a split in the printing section.

This split and normal mechanism is well known in the art, and further description thereof is unnecessary. Indeed, the parts above referred to, with the exception of the positioning bars 310, are well known, and only form a part of this invention, in so far as they coöperate with the novel features, which I will now explain.

Figure 5:
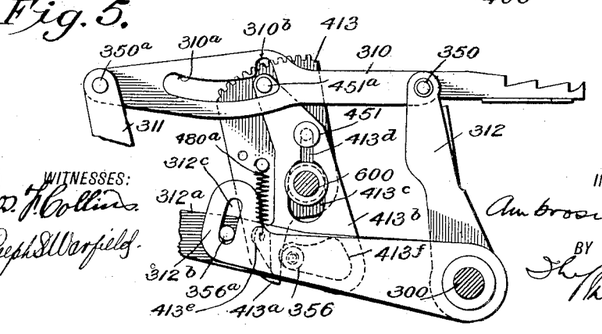
Fig. 5 is an enlarged detail view of a counter drive member and its positioning bar, showing the positions occupied by the parts upon the complete depression of the controlling key, and prior to the advance of the positioning bar.

The usual accumulating counters 490 having pinions 435 fixed thereto, are journaled on an axle 400, adapted to shift bodily to engage the pinions with and disengage them from the corresponding counter-drive members 413. Such counter-drive members, in the present invention, comprise toothed segments journaled on the cross rod 600 extending between the side frames 967. Springs 480 retain the segments in normal retired position, which position is determined by stops 356 (see Fig. 5) carried by rearwardly extending latch-controlling levers 312$^a$ journaled at their forward ends on the cross shaft 300, the projecting stops 356 lying in the paths of tails 413$^a$ depending from the segments below the fulcrum shaft 600 to arrest the segments on their return to normal position.

The rear ends of the levers 312$^a$ support a bail 405$^a$ (best shown in Fig. 4), and links 422 depending from radius arms 421 rigidly secured on the opposite ends of a shaft 405 journaled in the printer side frames 565, connect with the bail to sustain the arms 312$^a$ and their stops 356 in normal position.

Shiftable latches 413$^b$ connect the counter-drive segments or members 413 with the positioning bars 310, whereby, during an adding operation, the bars adjust the segments to proper positions to register on the counters, the amounts set up on the keyboard, and also permit the counters 490 to control the positioning bars 310 during totaling or clearing operations. The segments thus operate as intermediary mechanisms between the positioning bars and counters.

The latches 413ᵇ in the present instance, are flat plate members of irregular shape, fitting against the sides of the segments and are slotted as at 413ᶜ, to embrace the cross rod 600 for guidance, said slots being reduced, as at 413ᵈ (see Fig. 5), to embrace headed studs 451 projecting laterally from each of the segments. The studs 451 cooperate with the rod 600 to guide the latches in a rectilinear path relatively to the segments, the heads of the studs operating to prevent lateral play of the latches.

The several positioning bars 310 have longitudinally extending slots 310ᵃ formed therein, which slots preferably communicate with offsets or seats 310ᵇ normally occupied by laterally projecting rolls or teeth 451ᵃ carried by the latches 413ᵇ. Springs 480ᵃ connect lugs 413ᵉ of the latches with their respective segments 413 to retain the teeth 451ᵃ seated in the offsets, and thereby lock the segments to their respective positioning bars 310 to travel with the latter.

Turning the main drive shaft 200 withdraws the restraining and restoring bar 205 and tensions springs 383 to advance the positioning bars against the key set stops 115 or the usual rack detents 221 (Fig. 1) in those denominations wherein no keys have been depressed.

The positioning bars, as they advance to locate the proper types 561 at the printing line, will rock the counter-driving members 413 forwardly the proper distance, because of the latches 413ᵇ which connect the positioning bars and drive members, so that when the positioning bars and their connected drive members are returned to normal position, the drive members will turn the correlated counters 490 through the respective numbers of steps to register thereon an amount corresponding to that set up on the keyboard. During the advance of the segmental drive members 413, their tails or extensions 413ᵃ will rock backwardly away from the stops 356 and the comparatively light steadying springs 480 of the segments will be tensioned. These springs are readily overcome by the drive springs 383 on the forward stroke, and assist the latter to return the parts on the return stroke.

The usual carrying mechanism (not shown) transfers the excess "ones" from counters of lower denomination to those of the next higher denomination clear across the machine.

It is sometimes desirable to list or print at one operation, a designating number or character, which is not to be registered or accumulated on the counters, and an amount which is to be registered on the counters, and to enable such operations, the latches 413ᵇ are shiftable to disconnect the drive members 413 from the positioning bars 310, so that the latter are free to locate the proper types at the printing line while the drive members remain in their home positions where they are held against accidental travel by their springs 480.

In case all the segments were disconnected from their positioning bars, no registration would take place on the counters and the amount set up on the keyboard would be "non-added." Hence, I arrange that a predetermined number of rows or banks of keys 117 with their associated positioning bars 310 and segments or racks 413, counters 490, type-carriers 514 and printing hammers 512, shall operate in the normal manner, there being no provision for disconnecting the latches 413ᵇ of such segments 413 from their positioning bars, whereas, the remaining denominations or rows of keys and their associated mechanisms may be devoted when desired to the listing of numbers or characters, not to be accumulated or registered on the corresponding counters. I preferably interrupt the connections between the counters and positioning bars of all such denominations at a point coincident with the interruption of the cipher printing in the printing section.

In order to render the invention more easily understood, it may be assumed that the counter-driving members 413 to the right of the split or point of interruption of cipher printing, are the usual Wales rack bars illustrated in patent to McFarland, #842,232, for example, and that all the counter-drive members 413 to the left of the split are as illustrated in the accompanying drawings.

As one means to disable the latches 413ᵇ to the left of the split, I provide each latch with an elongated aperture 413ᶠ entered by the projecting stop 356 on the adjacent lever 312ᵃ, one end wall of the aperture lying adjacent the stop. The aperture is of sufficient length to permit the segment 413 to rock forwardly throughout its full stroke in accumulating, or totaling and clearing operations without interference from the stop 356.

Depression of the radius arms 421, therefore, will rock the bail 405ᵃ and the respective latch-controlling levers 312ᵃ, and lower the stops 356 to retract the latches 413ᵇ against the tension of their springs 480ᵃ and withdraw their teeth 451ᵃ from the offset seats 310ᵇ into registry with the slots 310ᵃ in the positioning bars 310, thereby freeing the segments or counter-drive members 413 to the left of the split from their positioning bars 310.

The extensions 413ᵃ of the segments 413 are of sufficient length to contact the stops 356 in any position to which the stops may be shifted, and furthermore, the extensions conform to the path of travel of the stops, so as to be arrested in their normal positions notwithstanding the adjustment of the stops.

When the latches disconnect the counter-drive members from the positioning bars 310, the latter may advance and return in the operations of the machine, to position any of the types at the printing line and retire them, the rolls or teeth 451ª of the latches being embraced between the walls of the longitudinally extending slots 310ª of the positioning bars, which shift back and forth relatively to the latches and the drive members.

Figure 1:
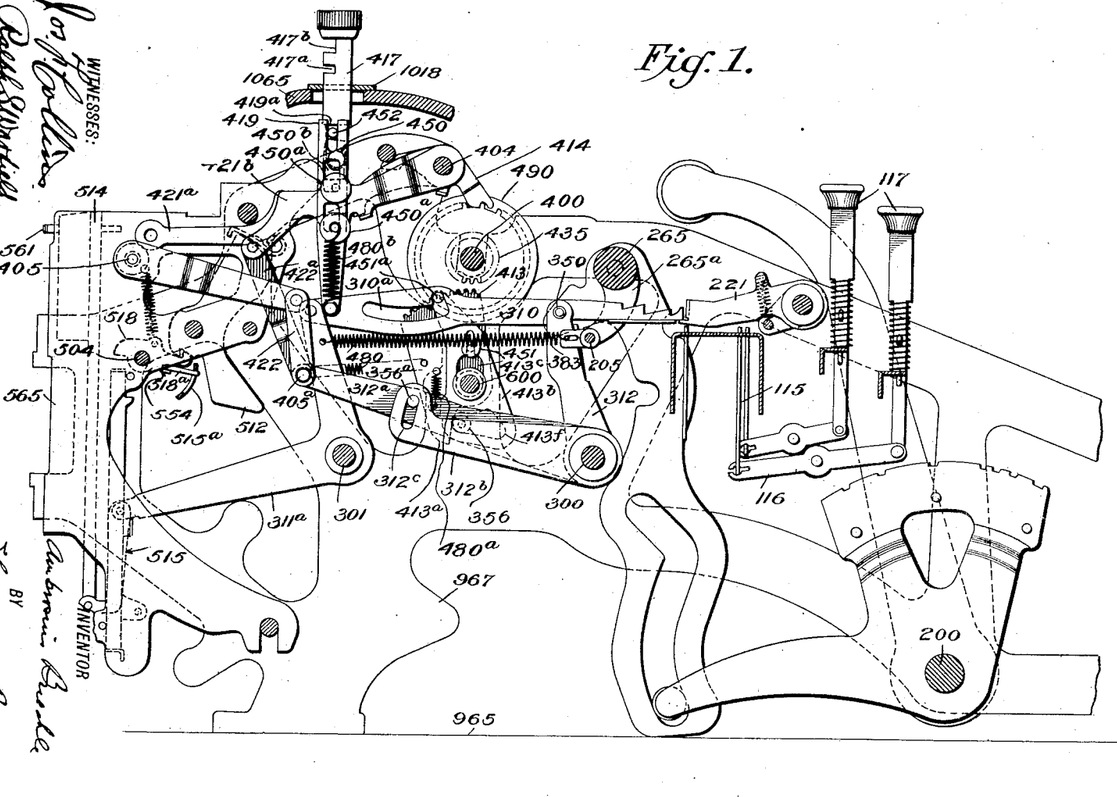
Figure 1 is a sectional view through a machine of the Wales construction, disclosing one embodiment of the invention, the parts being in normal idle position.
Figure 2:
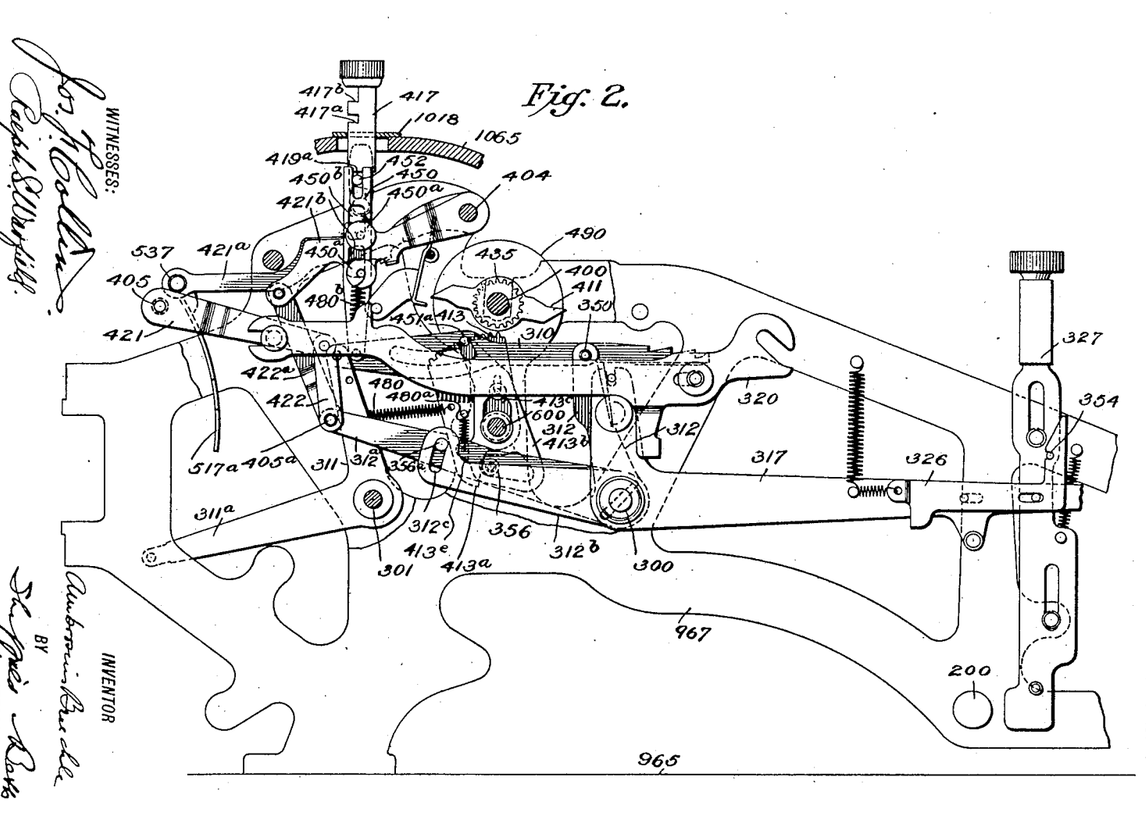
Fig. 2 is a side elevation of the same, partly in section.

Also, the counter pinions 435 engage with and disengage from the segments 413, which lock the counters to the left of the split against accidental rotation while released from the usual counter detents 414, (Fig. 1).

The means for manually disconnecting the latches 413ᵇ from the positioning bars 310 is rendered simple and compact, by connecting the latch-controlling mechanism with the key 417 controlling the customary split and normal condition of the printer section.

Thus, a rearwardly extending latch-controlling lever 421ᵇ is journaled on the cross rod 404 adjacent the split and normal controlling lever 421ª, and a link 422ª connects the latch-controlling lever and the bail 405ª mounted in the rear ends of the retracting levers 312ª. A slide or flexible coupling 419 is guided by headed studs 450ª, projecting from the latch-controlling lever 421ᵇ through slots 450ᵇ in the coupling, and a spring 480ᵇ connects the coupling and lever to hold the coupling at the upper end of its travel, as illustrated in Fig. 1. A return spring 480ᶜ (Fig. 3) normally retains the latch-controlling lever in idle position.

The split and normal key 417, which projects through an opening in the case 1065, has two slots 417ª and 417ᵇ, whereby it may be locked in its partially and wholly depressed positions, respectively, by rocking it so that the notches fit over the edge of an escutcheon plate 1018 surrounding the opening in the case. Partial depression of the key rocks lever 421ª to displace the pivoted tail 518ª in the printer section, and effect the split therein. A pin 452 on the split and normal key stem 417 projects outwardly therefrom into a guide and retaining slot 419ª in the flexible coupling or slide 419 on the latch-controlling lever 421ᵇ, and upon the partial depression of the key, the pin is brought in close proximity to the bottom of the retaining slot.

The pin 452, during the further depression of the key 417, contacts the bottom wall of the retaining slot 419ª and forces the slide or coupling 419 downwardly relatively to the latch-controlling lever 421ᵇ, tensioning the spring 480ᵇ until the latter overcomes the tensions of the latch-restoring springs 480ª collectively, and draws the latch-controlling lever 421ᵇ downwardly to shift the bail 405ª and the attached releasing levers 312ª and thereby retract the teeth 451ª of the latches 413ᵇ from engagement with the recesses 310ᵇ in the slots 310ª of the positioning bars 310 through the engagement of the pins 356 on the levers 312ª with the slots 413ᶠ of the latches 413ᵇ.

The radius arms 421 on shaft 405, and their links 422, steady the bail 405ª and the levers 312ª, so that the latter shift evenly and uniformly.

The split condition of the printer section is maintained during this further travel of the key 417, which is locked by means of the notch 417ᵇ and escutcheon plate 1018 in position to maintain the latches 413ᵇ disabled, against the tension of the coupling spring 480ᵇ, the two controlling-lever restoring springs 481 and 480ᶜ, for levers 421ª and 421ᵇ and the latch-restoring springs 480ª.

As the operation of the carrying mechanism is not impaired by the disconnection of the drive members 413 from their positioning bars 310, it is obvious that in case the amounts registered on the counters 490 to the right of the split, appropriated to registration and accumulation, exceed the capacity of such counters, the digits of higher denominations will be carried on to the next adjacent counters corresponding with the denominations to the left of the split, on which direct registration has been prevented.

To print a total of the accumulated amounts registered on the counters in such case, it is desirable to restore the connections between the drive members 413 and the positioning bars 310, which may be effected by releasing the split and normal key 417 from its locked position, after which the usual total operation may be performed.

Should the operator have a succeeding calculation of a similar nature to perform, however, he might forget to redepress the split and normal key 417, and in any event, the release and resetting of this key would impose a mental operation, which it is desired to avoid.

Figure 6:
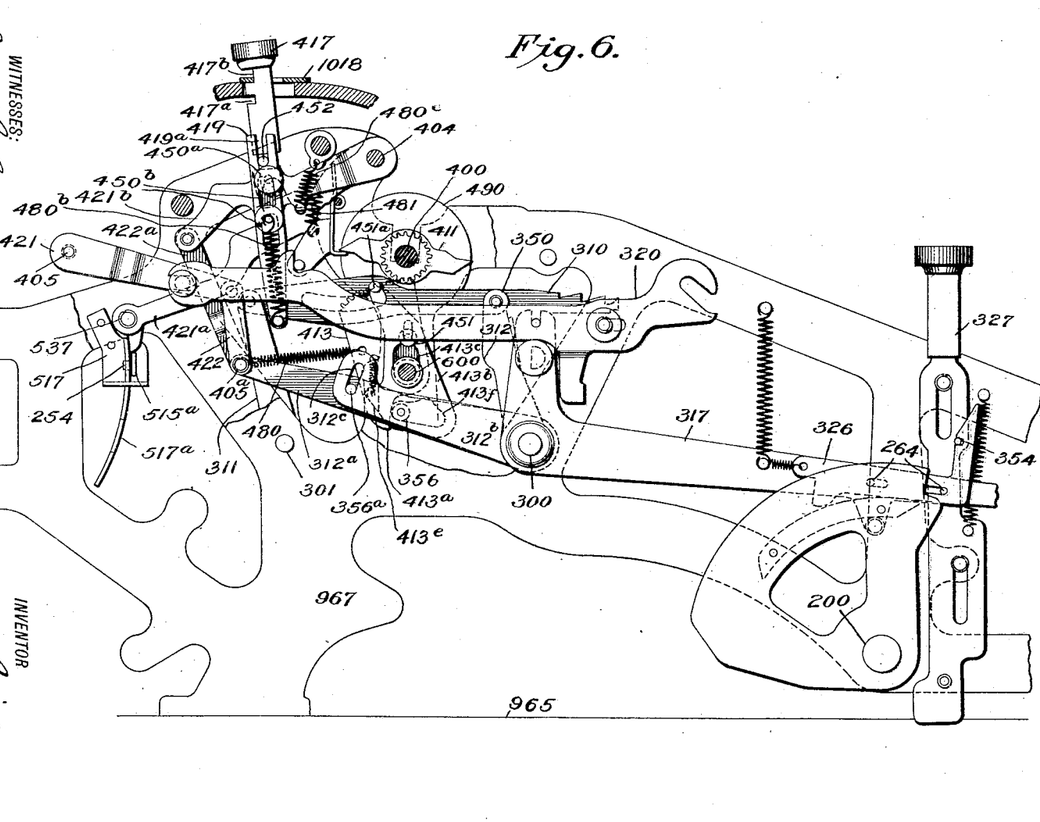
Fig. 6 is a side view, parts being broken away, and omitted, showing the total key control of the latches which releasably connect the drive members and their positioning bars, the total key being depressed, and the main shaft partly advanced.

Therefore, I have contrived to restore the latches 413ᵇ to effective position by the usual total taking operation (Figs. 2 and 6), and without disengaging the key 417 which remains in locked position, as shown in Fig. 6.

Depressing the usual total key 327 rocks the total key lever 317 fast on the cross shaft 300 to turn the shaft. A catch 326 slidably mounted on studs 264 on the total key lever, normally engages a pin 354 on the total key 327 to enable the latter to rock its lever. Cranks 312ᵇ fast on the cross shaft 300, extend rearwardly and have slots 312ᶜ entered by pins 356ª on the latch-retracting levers 312ª.

Figure 3:
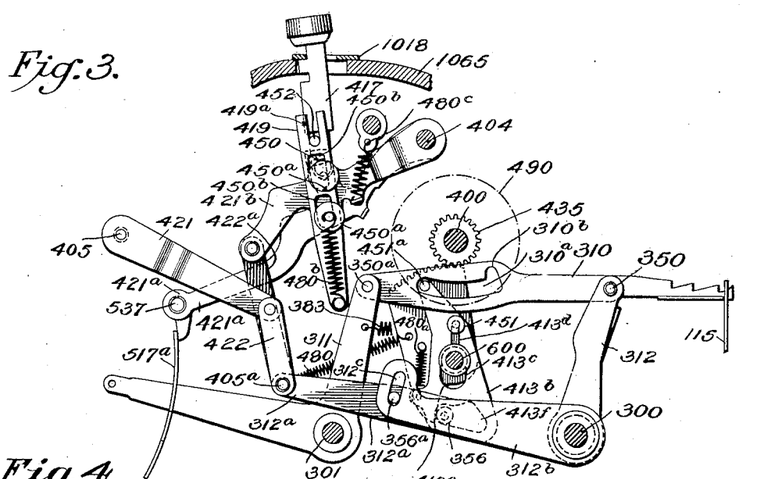
Fig. 3 is a detail side view, parts being shown in section, illustrating the positions of the parts when set to effect the split in the printing section, and the disconnection of the drive members to the left of the split from their corresponding positioning bars, a positioning bar being advanced against its key-operated stop.
Figure 4:
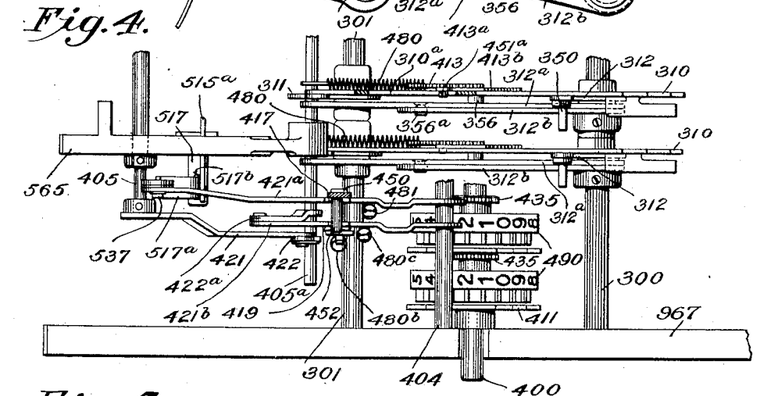
Fig. 4 is a fragmentary plan view of the mechanism in normal position.

In the normal condition of the machine, the pins 356ª on the retracting levers, lie at the upper ends of the slots 312ᶜ (Fig. 1), but upon the complete depression of the key 417, the levers swing downwardly and position the pins 356ª at the lower ends of the slots in the cranks 312ᵇ, as shown in Fig. 3.

Therefore, as the total key is depressed to rock the shaft 300, the cranks 312ᵇ rise and force retracting levers 312ª and the stops 356 carried thereby upwardly to normal position, thereby releasing the latches 413ᵇ to the action of their springs 480ª, which return the latches to effective position, to lock together the segments 413 and positioning bars 310.

The upward thrust of the retracting levers due to raising the cranks 312ᶜ, forces the link 422ª and the latch-controlling lever 421ᵇ upwardly, relatively to the flexible coupling 419, the latter being held in depressed position by the key 417, which is still locked down, and still further tensions the spring 480ᵇ, as in Fig. 6. The length of the slots 450ᵇ in the coupling permits the movement of the latch-controlling lever relatively thereto.

The latch controlling lever 421ᵇ during this upward travel, exercises no effect upon the split and normal controlling lever 421ª which is operable independently thereof, and consequently the split in the printer section remains effective.

The total key 327 displaces the usual detents 221 and sets the usual Wales mechanism (not shown) to effect the engagement of the pinions 435 with their segments 413, at the beginning of the forward stroke of the main drive shaft, and the disengagement of the pinions and segments upon beginning the return stroke thereof.

Upon the release of the total key, the tensioned spring 480ᵇ automatically returns the latch-retracting levers 312ª to their lowered positions to disconnect the drive members 413 and positioning bars 310, whereby the machine is reset to permit the listing of designating characters to the left of the split, without accumulating such characters on the counters.

It will be observed from the foregoing description that the total key does not eliminate the split in the printing section, and hence, if there is a cipher in the denominational counter immediately to the right of the split, preceeded by a significant digit or digits on the counter or counters corresponding with the denominations to the left of the split, such cipher will not be printed.

Figure 7:
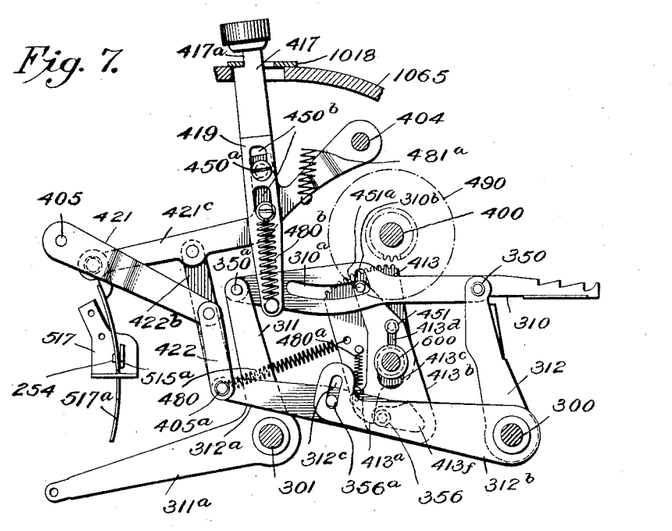
Fig. 7 is a detail side view of a slightly modified form, showing the controlling key depressed.
Figure 8:
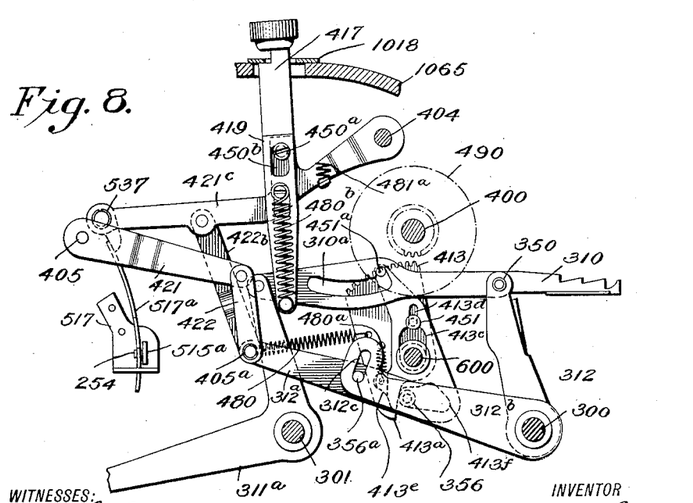
Fig. 8 is a detail side view of the modified form, showing the total key control of the split in the printing section.

The form of my invention shown in Figs. 7 and 8 of the drawings, however, effects the printing of such cipher by enabling the total key to eliminate the split in the printing section, as well as restoring the connections between the counter-drive segments and their positioning bars.

In this form, I preferably combine the latch-controlling, and split and normal controlling levers of the first form, in a single lever 421ᶜ journaled on cross rod 404, on which lever is mounted the flexible coupling or slide member 419 by a pin and slot connection, as previously described. The spring 480ᵇ connects the coupling slide to the controlling lever. The key 417 is directly mounted on the coupling, and a spring 481ª normally holds the lever 421ᶜ in its elevated position.

The split and normal switch cam 517ª is pivoted at 537 to the controlling lever 421ᶜ, and a link 422ᵇ extends from the controlling lever 421ᶜ to the bail 405ª.

The key 417 has but two positions, a single notch 417ª being provided in its stem to lock the parts in operated position.

Depression of the key 417 rocks the lever 421ᶜ through the coupling 419 and spring 480ᵇ, and operates the switch finger 517ª to disable the pivoted tail 518ª and thus form the split in the printing section. Contemporaneously, the controlling lever 421ᶜ through the link 422ᵇ, rocks the bail 405ª to swing downwardly the retracting levers 312ª and withdraw the latches 413ᵇ from engagement with their positioning bars 310. Locking the key 417 in depressed position maintains the parts in their operated positions.

Depressing the total key turns the shaft 300 as before described, and raises the cranks 312ᵇ to restore the retracting levers to normal position against the tension of spring 480ᵇ, and enables the latch springs 480ª to render the latches 413ᵇ effective, as heretofore set forth.

The restoration of the retracting levers 312ª operates through the link 422ᵇ to force the controlling lever 421ᶜ upwardly against the tension of the coupling spring 480ᵇ, which lever shifts the cam finger 517ª to enable the switch plate 515ª to return the pivoted tail 518ª (Fig. 1) to effective position, and thereby eliminate the split in the printing section.

Operation of the main drive shaft 200 will turn the counters to zero in the usual manner and position the types representing the amount registered, at the printing line, whereupon the hammers will fire to print the amount, without any interruption of cipher printing to the right of the digit of highest value.

Upon the release of the total key, the cranks 312ᵇ return to normal position, to release the controlling lever 421ᶜ and the retracting levers 312ª to the action of the tensioned spring 480ᵇ, which rocks the retracting levers downwardly with the cranks 312ᵇ to disable the latches 413ᵇ, and resets the cam finger 517ª to effect the split in the printing section.

In either form, it will be observed that the full capacity of the machine may be used on which to accumulate the total of the amounts being added on one side of the split.

Furthermore, the manually operable or split-controlling key, when set, does not interfere with or alter the totaling capacity of the machine.

The withdrawal of the latches 413ᵇ does not change the accumulating mechanism in any manner, the drive members 413 remaining in alinement with the pinions of the accumulators, which engage and disengage with the drive members at all times, irrespective of the position of the controlling key.

In this invention, there is a definite division of the keyboard effected by the depression of the controlling key, the denominational rows of keys in one section being devoted to the setting up of accumulating amounts, and the rows of keys in another section being used wholly for the purpose of setting up abstract items, which are printed only.

The function of the totaling mechanism remains unchanged in all operations irrespective of the position of the controlling key. Hence, the term "undisturbed total mechanism" is most appropriate.

The split in the printer and the latch mechanism connecting the toothed adding segments or drive members and the positioning bars, are controlled from a single mechanism, which, in the present instance, is manually operated, but which may be actuated otherwise, if desired.

Changes may be made in the form and arrangement of the several parts described without departing from the spirit and scope of this invention.

What I claim as new, is:—

1. In a calculating machine, the combination with a series of counters; and a keyboard mechanism; of positioning bars to coact with the keyboard mechanism; drive members for the counters; latches shiftably mounted on the drive members; the positioning bars having slots with offsets therein; teeth on the latches normally seated in the offsets to lock the drive members and positioning bars together; and means to withdraw the teeth from their seats into the body portions of the slots in the positioning bars.

2. In a calculating machine, the combination with a series of counters; a series of type carriers and a keyboard mechanism; of positioning bars for the type carriers adapted to coact with the keyboard mechanism; drive members for the counters; releasable connections between the drive members and positioning bars to enable the latter to control the excursions of the drive members; and means to disable the connections to permit the positioning bars to operate independently of the drive members, said means also adapted to arrest the drive members in their retired positions at all times.

3. In a calculating machine, the combination with a series of counters; and a keyboard mechanism; of positioning bars which coact with the keyboard mechanism; drive members for the counters; releasable connections between the drive members and positioning bars; including apertured latches shiftable on the drive members; arms having stops entered in the apertures in the latches; a special key; and flexible connections between the key and the arms to swing the latter and retract the latches from effective engagement with the positioning bars; means to lock the special key in operated position; and a total key and connections to the arms, to return the latter to normal position and enable the latches to reengage the positioning bars while the special key is in locked position.

4. In a calculating machine, the combination with a series of counters; and a keyboard mechanism; of positioning bars which coact with the keyboard mechanism; drive members for the counters; releasable locking elements between the drive members and the corresponding positioning bars; a manually operable device; flexible connections between the device and the releasable locking elements to disconnect the drive members from their positioning bars; means to retain the manually operable device in effective position; and means to restore the locking elements to operative positions, while the manually operable device is in effective position.

5. In a calculating machine, the combination with a series of counters; of positioning bars; drive members for the counters; releasable locking elements to connect the drive members with their corresponding positioning bars; a manually operable device; flexible connections between the manually operable device and the releasable locking elements, to release the locking elements; and including a coupling; a spring to hold the coupling in one of its positions, the manually operable device adapted to shift the coupling and tension the spring, whereby to disable the locking elements; means to lock the manually operable device in effective position; and total key-controlled mechanism operable upon the connections which control the locking elements to release the latter for effective operation while the coupling remains in operated position.

6. In a calculating machine, the combination with a series of counters; of positioning bars; means to connect the counters and positioning bars, including drive members engaged and disengaged by the counters; and releasable locking elements to connect the drive members with their corresponding positioning bars; a lever and connections to control the releasable locking elements; a coupling mounted on the lever; a spring connecting the coupling and lever; a manually shiftable device operable upon the coupling, to rock the lever and disable the locking elements; and total key-controlled mechanism to permit the restoration of the connections and lever to normal position while the manually shiftable device remains in effective position.

7. In a calculating machine, the combination with a series of counters; of positioning bars; drive members for the counters; releasable locking elements to connect the drive members with their respective positioning bars; a lever and connections to control the releasable locking elements; a manually operable device; a flexible connection between the device and the lever to effect the operation of the lever; the manually operable device adapted to be locked in operated position to maintain the locking elements disabled; and a total key mechanism to return the locking elements to effective position while the manually operable device remains in its operated position.

8. In a calculating machine, the combination with a series of counters; and a printing section, including type carriers; of positioning bars connected with the type carriers; drive members for the counters; releasable locking elements to connect the drive members with their corresponding positioning bars; springs to normally maintain the locking elements in effective position; a lever and connections to control the releasable locking elements; a slide carried by the lever, the slide and lever being relatively shiftable; a spring to connect the slide and lever; a manually operable device to engage the slide and tension the spring to release the locking elements, the manually operable device adapted to be locked in its operated position to maintain the locking elements idle; and means to connect the total key with the lever and its connections to restore the latter to normal position and free the locking elements to the action of their springs, while the manually operable device is in locked position.

9. In a calculating machine, the combination with an accumulating mechanism, including a series of counters and their drive members adapted for engagement and disengagement; the series of counters being inseparable and shiftable as a whole into and out of engagement with their drive members; a keyboard mechanism, including denominational rows of keys corresponding with the respective counters; and a printing mechanism, including corresponding denominational groups of printing devices; of controlling mechanism to effect a split in the printing mechanism at a predetermined point between two adjacent groups of printing devices to prevent the imprint of ciphers to the right of such point, and thus divide the keyboard mechanism at a corresponding point between two adjacent denominational rows of keys; and means also operated by said controlling mechanism to enable the printing only of amounts set up on a section of the keyboard at one side of the split, while permitting the engagement of the counters and their drive members corresponding with the keys in said section of the keyboard simultaneously with the engagement of the counters on the opposite side of the split with their drive members, the accumulating mechanism corresponding with such keyboard section adapted to remain unaltered by the depression of the controlling mechanism.

10. In a calculating machine, the combination with an accumulating mechanism, including a series of counters and their drive members adapted for engagement and disengagement; the series of counters shiftable as a whole into and out of engagement with their drive members; a keyboard mechanism, including denominational rows of keys corresponding with the respective counters; and a printing mechanism, including corresponding denominational groups of printing devices; of a controlling mechanism to effect a split at a predetermined point in the printer mechanism, and thus divide the keyboard into sections at a corresponding point between two adjacent denominational rows of keys; and means also operable by the controlling mechanism to permit the printing and prevent the registration on the corresponding counters, of amounts set up on one section of the keyboard although such corresponding counters are engaged with their drive members, and permit the registration on the corresponding counters, and the printing of amounts set up on another section of the keyboard, the accumulating mechanism adapted to remain unaltered to permit the accumulation of totals to the full capacity of the machine.

11. In a calculating machine, the combination with an accumulating mechanism, including a series of denominational counters; drive members engageable and disengageable relatively to the counters; the series of counters being inseparable, and shiftable as a whole into and out of mesh with the drive members; a carrying mechanism for the counters; a keyboard, including denominational rows of keys corresponding with the counters; and a printer mechanism, including corresponding denominational groups of printing members; of a controlling mechanism to effect a split in the printer mechanism at a predetermined point, and thus divide the keyboard into sections at a corresponding point; and means operable by the controlling mechanism to permit the printing and prevent the registration on the corresponding counters, of items set up on one section of the keyboard, while permitting the usual engagement and disengagement of the corresponding counters and drive members.

12. In a calculating machine, the combination with an accumulating mechanism, including a series of denominational counters; drive members engageable and disengageable relatively to the counters; the series of counters being inseparable, and shiftable as a whole into and out of engagement with the drive members; a carrying mechanism for the counters; a keyboard, including denominational rows of keys corresponding with the counters; a total mechanism; and a printer mechanism, including corresponding denominational groups of printing members; of a controlling mechanism to effect a split in the printer mechanism at a predetermined point, and thus divide the keyboard into sections at a corresponding point; and means operable by the controlling mechanism to permit the printing and prevent the registration on the corresponding counters, of items set up on one section of the keyboard, while permitting the usual engagement and disengagement of the corresponding counters and drive members, and maintaining the function of the total mechanism.

13. In a calculating machine, the combination with an accumulating mechanism, including a series of denominational counters; drive members engageable and disengageable relatively to the counters; the series of counters being inseparable, and shiftable as a whole into and out of engagement with the drive members; a carrying mechanism for the counters; a keyboard, including denominational rows of keys corresponding with the counters; and a printer mechanism, including corresponding denominational groups of printing members; of a single controlling mechanism to effect a split in the printer mechanism at a predetermined point, and to effect the operation of means to permit the printing and prevent the registration on the corresponding counters, of items set up on one section of the keyboard, while permitting the usual engagement and disengagement of the corresponding counters and drive members; and permit the registration on the corresponding counters and the printing of amounts, set up on another section of the keyboard, without affecting the carrying mechanism, to enable totals to be carried onto the counters of the adjacent section wherein direct registration is prevented.

14. In a full capacity calculating machine, the combination with an accumulator unit, comprising a series of denominational counters, and drive members therefor, the counters and drive members adapted for relative engagement and disengagement; the series of counters being inseparable, and shiftable as a whole into and out of engagement with the drive members; carrying mechanism between the respective counters; a keyboard mechanism, including denominational rows of keys corresponding with the respective counters; and a printer mechanism, including corresponding denominational groups of printing members; of a controlling mechanism to effect a split in the printer at a predetermined point to permit the printing of items set up on certain denominational rows of keys corresponding with the section of the printer to one side of the split, while preventing the registration of such items on the corresponding counters, while permitting the printing or registration of amounts set up on other denominational rows of keys, and the simultaneous engagement and disengagement of all of the counters and their drive members, said controlling mechanism adapted to permit the carrying mechanism to accumulate part of the sum total of the amount registered, onto the counters on which direct registration is prevented, and enable the total mechanism to effect the setting up of such part of the total, on the corresponding groups of printing members.

15. In a calculating machine, the combination with a series of counters and drive members relatively engageable and disengageable; a printer mechanism, including a split device; and a keyboard having denominational rows of keys corresponding with the respective counters; of positioning bars for the drive members; means to releasably connect the drive members and positioning bars at one side of the split; and a controlling means to effect the split in the printer mechanism, and to release the drive members and positioning bars, while permitting the engagement and disengagement of the counters and the drive members.

16. In a full capacity calculating machine, the combination with a series of counters, and drive members therefor relatively engageable and disengageable; positioning bars for the drive members; and means to releasably connect the drive members and bars; carrying mechanism between the respective counters; a printer mechanism, including groups of denominational printing members; a split device located between two adjacent groups; and a keyboard, including denominational rows of keys corresponding with the counters; of a controlling means to effect the split in the printer mechanism, and to release the means connecting the drive members and positioning bars which correspond with the counters and groups of printing members to one side of the split, to prevent direct registration on such counters, of items set up on the corresponding rows of keys, while maintaining the capacity of such counters to accumulate totals from the remaining counters, as well as permitting the engagement and disengagement of such counters and their drive members.

17. In a calculating machine, the combination with a series of counters; and a keyboard mechanism; of positioning bars which coact with the keyboard mechanism; drive members for the counters; releasable connections between the drive members and positioning bars; including apertured latches shiftable on the drive members; arms having stops entered in the apertures in the latches; a special key; and flexible connections between the key and the arms to swing the latter and retract the latches from effective engagement with the positioning bars.

18. In a calculating machine, the combination with a series of counters; a series of type carriers; and a keyboard mechanism; of positioning bars for the type carriers, adapted to coact with the keyboard mechanism to position the various types at the printing line; drive members for the counters; means tending to return the drive members to their normal positions of rest; releasable connections between the drive members and the positioning bars; means to release such connections to enable the positioning bars to operate independently of the drive members; and extensions on the drive members to contact with said releasing means in any of its adjusted positions, to limit the travel of the drive members under the influence of their returning means.

19. In a calculating machine, the combination with a series of counters; a series of type carriers; and a keyboard mechanism; of positioning bars for the type carriers, adapted to coact with the keyboard mechanism; means to advance and retire the positioning bars; drive members for the counters; springs to yieldingly retain the drive members in retired position; releasable connections between the drive members and positioning bars to enable the latter to control the excursions of the drive members; and means to disable the connections, to permit the positioning bars to operate independently of the drive members; said means also adapted to arrest the drive members in their retired positions against the tension of the springs.

20. In a calculating machine, the combination with a series of drive members; a series of counters shiftable as a whole into and out of engagement therewith; and a keyboard mechanism; of positioning bars; all of which are directly coöperable with the keyboard mechanism, whereby the latter may control the excursions of the positioning bars; type carriers, the types of which are located at the printing line according to the excursions of the positioning bars; latches to directly and releasably connect the drive members and positioning bars, whereby to enable the latter to control the excursions of the drive members; and a special member and connections to withdraw the latches, to enable the positioning bars and type carriers to operate independently of the drive members.

AMBROSIUS BRIECHLE.

Copies of this patent may be obtained for five cents each, by addressing the "Commissioner of Patents, Washington, D. C."